United States Patent Office 3,205,181
Patented Sept. 7, 1965

3,205,181
CALCIUM-COBALTOUS PHOSPHATE CATALYST
Robert S. Bowman and James M. Dixon, Pittsburgh, Pa.,
assignors to The Baugh Chemical Company, Baltimore,
Md., a corporation of Maryland
No Drawing. Filed Feb. 28, 1963, Ser. No. 261,828
3 Claims. (Cl. 252—437)

During recent years there has been a growing need for an effective catalyst for converting saturated or partially saturated heterocyclic nitrogen compounds into heterocyclic nitrogen compounds of lower hydrogen content. Typical examples are the conversion of methyl and ethylpiperazine to, respectively, methyl and ethylpyrazine, and of ethylpyrazine to vinylpyrazine. Other examples include the conversion of piperidine or alkylpiperidines to their corresponding pyridines, and of alkylpyridines where the alkyl group contains two or more carbon atoms to vinylpyridines.

Conventional hydrocarbon dehydrogenation catalysts have serious shortcomings when it is attempted to apply them to the foregoing purposes. For example, unlike their hydrocarbon analogues, the heterocyclic nitrogen compounds are subject in the presence of steam to hydrolytic side reactions which can seriously impair catalyst efficiency. Likewise, conventional catalysts for hydrocarbon dehydrogenation when used for that purpose with heterocyclic nitrogen compounds, such as those named above, show less activity and less selectively than is desired for efficient and economical use.

It is among the objects of this invention to provide a method of dehydrogenating heterocyclic nitrogen compounds which is simple; is applicable to saturated and partially saturated compounds of this class; is easily practiced with standard, readily available equipment; is of commercially desirable activity and selectivity; and makes use of an easily prepared catalyst of simple composition.

A further object is to provide a method in conformity with the foregoing object which is applicable not only to the ring dehydrogenation of heterocyclic nitrogen compounds to convert them to lower hydrogen content but also to the production of vinyl heterocyclic compounds by side chain dehydrogenation.

Yet another object is to provide a novel dehydrogenation catalyst of simple composition which is easily prepared, which is especially adapted to dehydrogenation of heterocyclic nitrogen compounds, and which possesses desirable activity and selectivity for that purpose.

Other objects will appear from the following specification.

Specifically, we have discovered that certain cobalt-calcium phosphates are particularly well adapted for catalyzing the dehydrogenation of heterocyclic nitrogen compounds of the types mentioned above. The unique property of the cobalt-containing calcium phosphates of this invention will be illustrated by the following data.

The invention may be exemplified in the first instance by the catalyzed dehydrogenation of ethylpyrazine to vinylpyrazine. In this study a mixture of ethylpyrazine and water vapors was led, at about atmospheric pressure, through a 100 cc. bed of $3/16''$ catalyst pills in accordance with the present invention contained in an externally heated, stainless steel reactor tube of $15/16''$ inside diameter. An ethylpyrazine-water mole ratio of one to nine, at a total space velocity of 3900, was maintained by pumping a solution of ethylpyrazine in water onto a spiral vaporizer-preheater, mounted above the catalyst bed, using a precision, calibrated pump. Space velocity is defined as liters of vapor at reaction temperature per liter of catalyst bed volume per hour. The calculated average residence time under these conditions then is 0.92 second. The linear velocity is approximately $4 3/4$ inches per second. The temperature, usually in the 550–650° C. range, was measured at a point about one-third from the bottom of the $4 3/8''$ high catalyst bed.

The vapors emerging from the reactor tube were condensed in a spiral type, cold-water condenser. The condensed material was weighed, then saturated with potassium hydroxide which caused the organic material to separate as a distinct oil layer. This oil layer was separated, weighed and then analyzed by gas chromatography. The percent vinylpyrazine content was noted. The liquid selectivity was then calculated by dividing percent vinylpyrazine by the sum of the percent vinylpyrazine, percent methylpyrazine, and percent pyrazine. These latter compounds are found to be the chief by-products of dehydrogenation of this compound with our catalysts. Thus, the vinylpyrazine content of the liquid organic product will reflect catalyst activity, while the amounts of by-product methylpyrazine and pyrazine will be indicative of catalyst selectivity. Most of the runs were made over eight hour periods, after which the catalyst was steamed for a short period of time, then air-steamed for one-half to one hour to regenerate the catalyst, and then steamed for an hour or two. Data illustrative of the results of such a procedure are set forth in tables appearing hereinafter.

The preparation of effective cobalt-calcium phosphate catalysts can be carried out by either a co-precipitation technique, or by ion exchange, using an appropriate calcium phosphate. Typical examples will now follow. In the co-precipitation method, as, for example, in catalyst 304 (Table I), 40 g. of cobaltous carbonate ($CoCO_3$) are dissolved in 500 g. of dilute, aqueous ortho phosphoric acid solution ($H_3PO_4$) containing 100 g. of $P_2O_5$. The resulting, clear, purple solution is then added slowly with good stirring to 180 g. of calcium hydroxide

[$Ca(OH)_2$]

suspended in about 2000 g. of water. The rate of addition of the acid solution should be such that the suspension of $Ca(OH)_2$ remains alkaline. The resulting slurry is then stirred for one hour, then air-dried at 105° C. The dried product, a cobaltous calcium phosphate, is pulverized, and then calcined at 650° C. for one hour. The product is then pelletized, and then calcined again for one hour at 650° C. after which it is charged to the dehydrogenation reactor. Bulk densities in the range of 0.6–0.8 g. per cc. are obtained by this method.

In the ion exchange technique, as in catalyst 415 (Table II), the calcium phosphate is first prepared by the slow addition of 500 g. of dilute, aqueous phosphoric acid solution ($H_3PO_4$) containing 100 g. of $P_2O_5$ to a well-stirred aqueous slurry of 180 g. of calcium hydroxide in 2000 g. of water; the rate of addition should in this case also be such that the slurry remains alkaline. The resulting product slurry is stirred for about an hour, after which a water solution of 84 g. of water soluble cobaltous chloride hydrate is added. The mixture is stirred for several hours, after which it is suction filtered and water washed until the absence of chloride ion in the filtrates is established. The product cake is air-dried, and then processed as above for catalyst 304.

The cobalt content of these two catalysts, calculated as cobaltous oxide (CoO), is 10.2 weight percent for catalyst 304, and somewhat less than this value for catalyst 415 in the production of which a small amount of unexchanged cobalt salt was lost in the wash waters.

The calcium phosphates are defined in terms of CaO–$P_2O_5$ weight ratios. Thus, a ratio of 1.18 describes tricalcium phosphate, and a 1.32 ratio describes calcium hydroxyapatite. Ratios above 1.32 allude to more alkaline, or basic, calcium phosphates, while the more acidic, or less basic, members are found below 1.18. The two catalysts above are designed to have (CoO+CaO) to $P_2O_5$ ratios of 1.6, in which the calcium phosphate phase is a 1.36 $CaO-P_2O_5$ ratio material. In the present invention the basic calcium phosphates will be designated herein as BCP.

As shown in the following Table I it is of primary importance to avoid excess alkalinity in the catalyst. Thus, the mildly alkaline catalyst 304 exhibits the best performance. Catalysts 308 and 332 which are more alkaline due either to the addition of KOH (308) or to using a higher ratio BCP (312), are shown to be considerably less active and selective than catalyst 304. The commercially used dehydrogenation catalyst of Table I, an alkaline promoted iron oxide type, as well as an alkalized cupric oxide-BCP catalyst (286) are also shown to be less active and selective than catalyst 304. The acidic catalyst 348, the cobalt analogue of dicalcium phosphate, is likewise characterized by poor performance. It follows that neutral to mildly alkaline catalyst surfaces are preferred for the purposes of this invention.

*Table I.—Effect of alkalinity on catalyst performance in the dehydrogenation of ethylpyrazine*

| Catalyst No. | Composition weight, percent | Bed temp., °C. | Percent vinyl-pyrazine in liquid product | Percent liquid selectivity |
|---|---|---|---|---|
| 304 | 10.2% CoO / 89.8% 1.36 BCP | 600 | 38 | 91 |
| 308 | 10% CoO / 4% KOH / 86% 1.36 BCP | 600 | 39 | 70 |
| 332 | 8.3% CoO / 91.7% 1.6 BCP | 600 | 13 | 55 |
| 348 | $CoHPO_4$ | 600 | 2 | 55 |
| 33 | 8.9% CoO / 91.1% 1.0 BCP | 600 | 35 | 92 |
| 286 | 11% CuO / 4% KOH / 85% 1.36 BCP | 600 | 25 | 62 |
| Commercial dehydrogenation catalyst. | 84.4% $Fe_2O_3$ / 2.3% $Cr_2O_3$ / 13.3% KOH | 600 | 19 | 69 |

Also of great importance is the state of oxidation of the cobalt in the catalyst. The data in Table II, which follows, clearly reveal the necessity of having the cobalt in the cobaltous condition. This conclusion is supported by the method of catalyst preparation, and by X-ray diffraction analyses. Thus, whereas the cobalt phosphate catalysts 304, 333, and 415 are effective ethylpyrazine dehydrogenation catalysts, the cobalt oxide-containing catalysts 336 (no phosphate) and 402 (cobaltic oxide) are completely ineffective. These two catalysts are wild in behavior, in that the organic feed is converted to carbon and light gases, and no liquid organic material appears in the reactor effluent. The X-ray analyses of catalysts 304, 402, and 415 show the typical calcium hydroxyapatite pattern. In addition, cobalt oxide, added at the black cobalt oxide $Co_3O_4$ to a pre-precipitated 1.36 BCP in catalyst 402, is clearly detected in the X-ray pattern, and the composition showed no activity. The less alkaline catalyst 333 is found to exhibit the typical X-ray pattern of B-tricalcium phosphate. Catalysts 304 and 333 were prepared by the coprecipitation technique described previously, while 415 was prepared via ion exchange. Since these three catalysts possess only the calcium phosphate X-ray patterns as the major lines, it is evident that cobalt is incorporated into these calcium phosphates without causing a shift in the X-ray patterns. The absence of cobalt oxide lines (above the trace level) supports the conclusion that these effective catalysts are, in fact, cobalt-calcium phosphates. Catalysts 336, was prepared by heating a physical mixture of cobaltous acetate and calcium carbonate in air on a hot plate at about 200° C. to pyrolyze the acetate, followed by heating in steam for two hours at 1200° F.; the product showed the wild behavior attributable to cobalt oxide. In catalyst 332, the moderate performance can be attributed to a partially oxidic character of the cobalt, which may be due to the use of a high ratio BCP in a coprecipitation process resulting in some non-phosphatic cobalt compound.

*Table II.—Nature of cobalt species in active dehydrogenation catalysts*

| Catalyst | Composition, wt. percent | Temp., °C. | Percent vinyl-pyrazine in liquid product | Percent liquid selectivity |
|---|---|---|---|---|
| 304 | $Ca_9Co(OH)_2(PO_4)_6$ | 600 | 38 | 91 |
| 336 | 22.4% CoO / 77.6% CaO | 600 | 0 | 0 |
| 402 | 11.3% $Co_3O_4$ / 88.7% 1.36 BCP | 600 | 0 | 0 |
| 333 | 8.9% CoO / 91.1% 1.0 BCP | 600 | 35 | 92 |
| 415 [1] | $Ca_9Co(OH)_2(PO_4)_6$ | 600 | 38 | 91 |
| 332 | 8.3% CoO / 91.7% 1.6 BCP | 600 | 13 | 55 |

[1] Prepared by ion exchange between 1.36 BCP and $CoCl_2$.

Furthermore, neither cobaltous phosphate nor BCP possesses the dehydrogenation capability that is exhibited by the cobalt calcium phosphate of this invention. Thus, Table II-A shows the results obtained when ethylpyrazine was treated with those two materials under the conditions described in connection with Table I and II. It is clear that cobaltous phosphate is almost without activity, and that the 1.36 ratio BCP shows only moderate activity, giving further evidence that the active component of the 304-type catalysts is a cobalt calcium phosphate.

*Table II–A*

| Catalyst No. | Composition | Bed temp., °C. | Percent vinyl-pyrazine in liquid organic product | Percent liquid selectivity |
|---|---|---|---|---|
| 466 | $Co_3(PO_4)_2$ | 635 | 4.0 | 84 |
| 466 | $Co_3(PO_4)_2$ | 649 | 5.0 | 84 |
| 1136 | 1.36 BCP | 620 | 16.0 | 87 |
| 1136 | 1.36 BCP | 628 | 20.0 | 89 |
| 466-A | | 645 | 5.0 | 82 |

Catalyst B-466-A was prepared by treatment of cobaltous phosphate with $Ca(NO_3)_2$. The inactivity of this composition is evidence that ion exchange did not occur. Exchange catalysts of our invention can be prepared only by reacting a soluble cobalt salt with BCP.

In Table III data are presented for a series of cobalt-calcium phosphates prepared by coprecipitation to contain from about 4 to 14 percent of CoO in the phosphate, all of which are shown to perform well. In this series the best results were had with the 8–10 weight percent catalysts, which are therefore preferred.

*Table III.—Effect of cobalt content upon activity of cobalt phosphate dehydrogenation catalysts* [1]

| Catalyst | Percent cobalt calculated as CoO by wt. | Temp., °C. | Percent vinyl-pyrazine in liquid product | Percent liquid selectivity |
|---|---|---|---|---|
| 404 | 4.06 | 600 | 30 | 95 |
| 413 | 5.56 | 600 | 35 | 92 |
| 414 | 8.5 | 600 | 39 | 92 |
| 304 | 10.2 | 600 | 38 | 91 |
| 400 | 13.8 | 600 | 22 | 93 |

[1] All catalysts prepared by the co-precipitation method; all have 1.36 ratio BCP.

The data in the following Table IV reveal an optimum range for the $CaO-P_2O_5$ ratios in the calcium phosphate portion of the catalysts. Thus, the slightly acidic 1.0 ratios are almost as effective as the 1.15 and 1.36 ratio materials (approximately tricalcium phosphate and calcium hydroxyapatite, respectively). Further increases in alkalinity, to 1.6 ratio, produce marked decreases in the performance of the catalyst. Thus, it is shown that for the purposes of this invention calcium phosphates below a 1.6 $CaO-P_2O_5$ ratio should be used.

*Table IV.—Effect of BCP ratio upon activity of cobalt-calcium phosphate dehydrogenation catalysts*

| Catalyst | BCP ratio | Percent cobalt calculated as CoO | Temp., °C. | Percent vinylpyrazine in liquid product | Percent liquid selectivity |
|---|---|---|---|---|---|
| 333 | 1.0 | 8.9 | 600 | 35 | 92 |
| 401 | 1.0 | 16.2 | 600 | 37 | 93 |
| 338 | 1.15 | 10.4 | 600 | 38 | 92 |
| 304 | 1.36 | 10.2 | 600 | 38 | 91 |
| 332 | 1.6 | 8.3 | 600 | 13 | 55 |
| 399 | 1.6 | 19.6 | 600 | 16 | 79 |

Further study of these coprecipitated calcium phosphate catalysts shows that we believe cobalt to be the most effective metal for use in this application. Thus, in Table V, the use of copper, cadmium, zinc, chromium, nickel, and iron produce catalysts which are distinctly inferior to the cobalt-calcium phosphate catalysts, typified by catalyst 304.

*Table V.—Comparison among metal oxide-BCP catalysts in the dehydrogenation of ethylpyrazine*

| Catalyst | Percent metal present calculated as metal oxide by wt. | Temp., °C. | Percent vinylpyrazine in liquid product | Percent liquid selectivity |
|---|---|---|---|---|
| 304 | 10.2% CoO | 600 | 38 | 91 |
| 285 | 12.8% CuO | 600 | 32 | 82 |
| 454 | 10.6% CdO | 600 | 28 | 90 |
| 456 | 9.4% ZnO | 600 | 27 | 91 |
| 446 | 10.6% $Cr_2O_3$ | 600 | 21 | 90 |
| 331 | 11.7% NiO | 600 | 19 | 55 |
| 291 [1] | 5.9% NiO | 600 | 24 | 91 |
| 297 [2] | 11.5% NiO | 600 | 25 | 91 |
| 388 | 68% $Fe_2O_3$ | 600 | 14 | 67 |

[1] BCP ratio 1.05.  [2] BCP ratio 0.9.

Further, a study of catalyst phases other than calcium phosphate reveals that calcium phosphate is markedly superior for this purpose. Thus, in Table VI, a group of catalysts containing calcium silicate (496), in which the cobalt was incorporated by ion exchange, and the aluminate, chromate, arsenate and borate compounds, as in catalysts 428, 434, 436, and 437, respectively, do not perform as well as the calcium cobaltous apatite catalyst, 304.

*Table VI.—Comparison among various cobalt compounds in the dehydrogenation of ethylpyrazine*

| Catalyst | Composition | Temp., °C. | Percent vinylpyrazine in liquid product | Percent liquid selectivity |
|---|---|---|---|---|
| 304 | $Ca_9Co(OH)_2(PO_4)_6$ | 600 | 38 | 91 |
| 496 | $CaCo(SiO_3)_2$ | 600 | 3 | 77 |
| 428 | $Co(AlO_2)_2$ | 600 | 23 | 85 |
| 434 | $CoCrO_4$ | 600 | 20 | 79 |
| 436 | $CoHAsO_4$ | 600 | 14 | 75 |
| 437 [1] | $CoB_4O_7$ | 600 | 24 | 92 |

[1] Supported upon 1.36 BCP; 58% by weight.

The ethylpyrazine-water mol ratio and space velocity used in obtaining the data of Table I were used in the runs reported in Tables II and II-A to VI.

The removal of hydrogen from a saturated heterocyclic ring structure such as piperazine and the alkylpiperazines requires less drastic conditions than those for the removal of side-chain hydrogen from, for example, ethylpyrazine. However, we have discovered that the cobalt-calcium phosphate type catalyst of our invention is also very effective in catalyzing the ring dehydrogenation of the piperazines. Thus, as shown in the following Table VII, the cobalt-calcium phosphate catalyst 304 is clearly superior to the nickel, copper, and iron phosphate-calcium phosphate catalysts. In this work a stainless steel reactor similar to that described above was employed. A water solution of methylpiperazine containing one mole of methylpiperazine in 29 moles of water was employed as the feed to the reactor. At a vapor space velocity of 4370, the residence time was calculated to be 0.79 second. The linear velocity was 5.6 inches per second. Reaction periods up to 60 hours have been employed with only moderate decreases in catalytic activity. Catalyst regeneration is accomplished by the steaming and air-steaming process described herein above. In this work, it was found to be desirable to distill the entire reactor effluent through a 10-plate fractional distillation column until the organic water azeotropes or steam distillates had been collected. The distillate then can either be extracted with benzene, or saturated with KOH to remove the organic material. The constituents of the separated organic phase are then determined quantitatively by gas chromatography. Liquid selectivity values are calculated by dividing the methylpyrazine X 100 content by the sum of the methylpyrazine, low boiling amines, pyrazine, and higher boiling products.

*Table VII.—Comparison of metal oxide-BCP catalysts in the dehydrogenation of methylpiperazine*

| Catalyst | Percent metal calculated as metal oxide by wt. | BCP ratio | Temp., °C. | Percent methylpyrazine in liquid product | Percent liquid selectivity |
|---|---|---|---|---|---|
| 304 | 10.2% CoO | 1.36 | 490 | 90 | 96 |
| | | | 565 | 90 | 95 |
| 331 | 11.7% NiO | 1.36 | 500 | 89 | 91 |
| 285 | 12.8% CuO | 1.36 | 515 | 50 | 53 |
| 283 | 47% $Fe_2O_3$ | 1.36 | 520 | 50 | 90 |
| | | | 570 | 80 | 88 |
| 377 | 47% $Fe_2O_3$ | 1.75 | 560 | 40 | 78 |

To summarize, we have discovered that cobaltous calcium phosphate catalysts prepared within the limits as described are singularly effective for the side-chain (lower alkyl) dehydrogenation of unsaturated heterocyclic compounds, such as ethylpiperazine and ethylpyridine to form the corresponding vinyl compounds. This type of catalyst is also remarkably effective in catalyzing ring dehydrogenations, such as in the conversion of piperazines and piperidines to, respectively, pyrazines and pyridines. The catalyst has also demonstrated the ability to convert, in a single stage process, ethylpiperazine to vinylpyrazine. In addition to the reductions noted hereinabove the invention is applicable to other dehydrogenations of heterocyclic nitrogen compounds, for instance to the conversion of piperidine and its derivatives to, respectively, pyridine and substituted pyridines, and to the conversion of pyrrolidene to pyrrole. All such compounds are of known usefulness by applying known organic chemistry reactions to produce a variety of other compounds useful as such or as intermediates in making other compounds.

The utility of the invention along the lines just indicated is shown by the following Tables VIII, IX and X.

*Table VIII.—Dehydrogenation of alkylpyridines*

| Catalyst No. | Alkyl pyridine | Bed temp., °C. | Percent vinyl-pyridine in the liquid organic product | Percent liquid selectivity |
|---|---|---|---|---|
| 304 | 2-ethyl | 570 | 12 | 100 |
| 304 | 2-ethyl | 620 | 20 | 96 |
| 304 | 2-ethyl | 660 | 30 | 90 |
| 304 | 4-ethyl | 600 | 21 | 96 |
| 304 | 4-ethyl | 620 | 26 | 93 |

*Table IX.—Dehydrogenation of piperidine*

| Catalyst No. | Carrier Gas or diluent | Bed temp., °C. | Percent pyridine in the liquid organic product | Percent liquid selectivity |
|---|---|---|---|---|
| 304 | $H_2O$ | 490 | 10 | 19 |
| 304 | $H_2O$ | 545 | 20 | 26 |
| 304 | Benzene | 480 | 22 | 26 |
| 304 | do | 510 | 44 | 53 |
| 304 | do | 530 | 76 | 78 |

*Table X.—Dehydrogenation of pyrrolidine*

| Catalyst No. | Bed temp., °C. | Percent pyrrole in the liquid organic product | Percent liquid selectivity |
|---|---|---|---|
| 304 | 435 | 5.5 | 64 |
| 304 | 490 | 29 | 91 |
| 304 | 590 | 56 | 96 |

In the runs of Table VIII the feed rates were as stated for Tables I and II.

In Table IX the feed rates were 0.5 g./min. of piperidine, 2.0 g./min. of water, and in the case of benzene 2.4 g./min. Hence the feed in the case of water was 1 mol of piperidine to 20.5 mols of water, and in the case of benzene it was 5.7 mols of benzene per mol of piperidine.

Similarly, the data of Table X were obtained using a feed rate of 0.5 g./min. of pyrrolidine and 3.6 g./min. of water, or a mol ratio of pyrrolidine to water of 1:28.5.

From the foregoing data it will be realized that in the practice of the invention such operating details as the ratio of heterocyclic nitrogen compound to water or diluent vapor and bed temperature may vary widely depending upon, for example, the particular compound to be dehydrogenated and the catalyst.

In the practice of the invention the non-condensable gases, chiefly hydrogen, may be exhausted with a hood on the small or laboratory scale while in commercial operation this gas stream may be burned as fuel or purified for other uses.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A calcium-cobaltous phosphate dehydrogenation catalyst consisting essentially of, analyticaly, by weight, about 4 to 14 percent of cobaltous oxide and the remainder CaO and $P_2O_5$ in weight ratios ranging from $CaO:P_2O_5$ equals 1:1 to $CaO:P_2O_5$ less than about 1.6:1.

2. A catalyst according to claim 1, said $CaO:P_2O_5$ ratio being about 1.36:1.

3. A catalyst according to claim 1, the ratio $CaO:P_2O_5$ being about 1.36:1 and the ratio $(CaO+CoO):P_2O_5$ being about 1.6:1.

References Cited by the Examiner

UNITED STATES PATENTS

| | | | |
|---|---|---|---|
| 1,882,712 | 10/32 | Andrussow et al. | 252—437 |
| 2,291,609 | 8/42 | Cobbs et al. | 23—108 X |
| 2,336,600 | 12/43 | Musther | 260—683.2 |
| 2,542,813 | 2/51 | Heath | 252—437 |
| 2,631,102 | 3/53 | Hubbard et al. | 23—109 X |
| 2,938,874 | 5/60 | Rosinski | 252—437 |
| 2,967,156 | 1/61 | Talvenheimo | 252—437 |
| 3,033,864 | 5/62 | Britton et al. | 260—250 |
| 3,067,199 | 12/62 | Langdon | 260—250 |

MAURICE A. BRINDISI, *Primary Examiner.*

JOHN D. RANDOLPH, *Examiner.*